(12) United States Patent
Raphaeli et al.

(10) Patent No.: US 7,756,230 B2
(45) Date of Patent: Jul. 13, 2010

(54) LOW POWER FAST IMPULSE RADIO SYNCHRONIZATION

(75) Inventors: Dan Raphaeli, Kfar Saba (IL); Gideon Kaplan, Kiryat Ono (IL)

(73) Assignee: Sandlinks Systems Ltd., Tel-Aviv (IL)

( * ) Notice: Subject to any disclaimer, the term of this patent is extended or adjusted under 35 U.S.C. 154(b) by 839 days.

(21) Appl. No.: 11/568,981

(22) PCT Filed: May 15, 2005

(86) PCT No.: PCT/IL2005/000506

§ 371 (c)(1),
(2), (4) Date: Nov. 13, 2006

(87) PCT Pub. No.: WO2005/112315

PCT Pub. Date: Nov. 24, 2005

(65) Prior Publication Data

US 2009/0103671 A1   Apr. 23, 2009

Related U.S. Application Data

(60) Provisional application No. 60/570,468, filed on May 13, 2004.

(51) Int. Cl.
*H04L 7/00* (2006.01)
(52) U.S. Cl. .................. 375/354; 375/365; 375/364; 375/366; 375/316
(58) Field of Classification Search ........... 375/354, 375/365, 364, 366
See application file for complete search history.

(56) References Cited

U.S. PATENT DOCUMENTS 5,678,227 A * 10/1997 Connell et al. ........... 455/343.4
5,687,169 A    11/1997 Fullerton
6,463,050 B1 * 10/2002 Nagashima ............... 370/347
6,963,736 B2 * 11/2005 Tahtinen .................. 455/343.1
2001/0034254 A1 * 10/2001 Ranta ..................... 455/574
2002/0018514 A1    2/2002 Haynes et al.
2003/0174048 A1 *  9/2003 McCorkle ............... 340/10.34
2004/0032825 A1 *  2/2004 Halford et al. ............ 370/208
2005/0111524 A1 *  5/2005 Baker et al. .............. 375/147

OTHER PUBLICATIONS

"Ultra-Wideband Communications" An Idea whose Time Has Come, L. Yang &GB Giannakis, IEEE Signal Processing Magazine, Nov. 2004.

* cited by examiner

*Primary Examiner*—Shuwang Liu
*Assistant Examiner*—Kenneth Lam
(74) *Attorney, Agent, or Firm*—Mark M. Friedman

(57) ABSTRACT

A method for synchronizing on a pulsed waveform sequence including pulsed waveforms. An impulse radio receiver is provided including a radio frequency (RF) front end connected to a demodulator, and the demodulator is connected to a processing unit. Power is provided to at least a portion of an RF component such as the RF front end and/or the demodulator, during time windows sufficient for testing an hypothesis regarding timing of the pulsed waveforms. The powering is controlled by the processing unit. Preferably, testing the hypothesis includes accumulating a signal of the pulsed waveforms, correlating with the pulsed waveforms, or accumulating the correlation result of the pulsed waveforms. Preferably, others functions of the receiver are powered or enabled subsequent to the testing. Preferably, the impulse radio receiver is an ultra-wide band receiver.

12 Claims, 2 Drawing Sheets

LOW POWER FAST IMPULSE RADIO SYNCHRONIZATION

CROSS REFERENCE TO RELATED APPLICATIONS

The present application is a national phase application under 35 U.S.C. 371 of international application PCT/IL2005/00506 filed 15 May 2005 which claims the benefit from U.S. provisional application 60/570,468 filed 13 May 2004 by Dani Raphaeli, one of the present inventors, included herein by reference as if entirely set forth herein.

FIELD AND BACKGROUND OF THE INVENTION

The present invention relates to impulse radio synchronization. Specifically, the present invention includes a system and method for impulse radio synchronization including an algorithm for achieving low average power consumption in the receiver. The present invention is primarily directed to applications of communication systems based on non-continuous transmission, e.g. impulse when the time interval between transmissions is predictable. Moreover, the present invention enables reception of more than one packet at the same times.

Impulse radio systems feature a transmitter that sends packets at times unknown to the receiver. Each packet includes:

(a) a preamble having a sequence of N repetitive pulses, or other short bursts of energy, with constant time delay. Alternatively, the preamble includes a sequence of N pseudo-random time delayed pulses or short bursts of energy.

(b) a Start Frame Delimiter used for marking the exact position of the beginning of the data. The Start Frame Delimiter is a sequence of symbols which are not found as a part of the preamble; thus finding the Start Frame Delimiter marks with high probability the beginning of the data.

(c) Data, used for payload or other functions known in digital communications

Methodology for fast acquisition of various models of data transmissions is well known (e.g. John J. Proakis, *Digital Communications* New York: McGraw-Hill, 1983, 1st ed., and 1989, 2nd ed.). In U.S. patent application 20020018514, "Method and system for fast acquisition of pulsed symbols", Haynes Leonard S. et. al, disclose a method which takes advantage of unique separation between consecutive pulses in order to identify the transmitted symbol. In U.S. Pat. No. 5,687,169, "Full duplex UWB communication system and method" disclosed by Fullerton et. al (1997), a particular scheme of pulsed waveform communication is outlined, along with the synchronization principle.

A particular method for synchronization with low power consumption is outlined in US patent application 20030174048, "Method and system for performing distance measurement and direction finding using UWB transmissions", disclose a dedicated RF circuit, separate from the receiver for the reception of pulses; the dedicated circuit identifies a particular signal that is transmitted, and then collects the power supply to the UWB (pulsed) receiver. Apart from the fact that two circuits are needed, there is no outline of how to save power while acquiring the pulsed waveform.

There is thus a need for, and it would be highly advantageous to have a method and a system, for fast impulse radio synchronization with low power consumption.

The following references are incorporated herein by reference as if fully set forth herein:

M. K. Simon, J. K. Omura, R. A. Scholtz, and B. A. Levitt, Spread Spectrum Communications. Rockville, Md.: Computer Sci., 1985

Ultra Wideband Communication: an idea whose time has come, L. Yang & G. B. Giannakis, IEEE Signal Processing Magazine, Nov. 2004.

SUMMARY OF THE INVENTION

Hereinafter, the term symbol is defined as one of a set of possible signals that a transmitter can send in a certain duration of time. A symbol can be for example a single pulse, a train of pulses modulated by a sequence, an arbitrary waveforms.

The terms "pulse", "pulsed waveform" and "symbol" are used herein interchangeably, A "pulse" or a "symbol" can be a single pulse, a pulse train modulated by a sequence, or any waveform of short duration relative to the interval between symbols. The term "pulsed waveform sequence" is a sequence of pulsed waveforms, such as the preamble of the packet.

The term "powering down" includes disabling at least a portion of a component in such a way that overall power requirement is reduced.

Hereinafter, the length of a time window is noted by W. The interval of time between windows start is noted by T.

Hereinafter, the term synchronization is defined as detecting the presence of the preamble, as described below, and its time of arrival and enables tracking of the timing of the received packet.

According to the present invention there is provided a method for synchronizing on a pulsed waveform sequence including pulsed waveforms. An impulse radio receiver is provided including a radio frequency (RF) front end connected to a demodulator, and the demodulator is connected to a processing unit. Power is provided to at least a portion of an RF component such as the RF front end and/or the demodulator, during time windows sufficient for testing an hypothesis regarding timing of the pulsed waveforms. The powering is controlled by the processing unit. Preferably, testing the hypothesis includes accumulating a signal of the pulsed waveforms, correlating with the pulsed waveforms, or accumulating the correlation result of the pulsed waveforms. Preferably, others functions of the receiver are powered or enabled subsequent to the testing. Preferably, the impulse radio receiver is an ultra-wide band receiver. Preferably, the pulsed waveform includes a series of pulses modulated by a binary sequence. Preferably, multiple hypotheses are tested and the powering allows testing the multiple hypotheses in parallel regarding timing of the pulsed waveform sequence. Preferably, the pulsed waveform sequence is scanned for and acquired by the processing unit even when the acquisition of the pulsed waveform sequence is achieved with a non-negligible probability of a false alarm; and performance is maintained despite the non-negligible probability of a false alarm. Preferably, the time interval between consecutive pulsed waveforms is uniform. Preferably, the scanning is performed every T1 seconds, wherein T1 is not an integral multiple of a time interval between consecutive pulsed waveforms. Preferably, the method further storing state variables pertaining to the receiver; powering down the component of the receiver; and powering up and restoring the component of the receiver. Upon reading the state variables, powering up and restoring is expedited. Preferably, restoring includes restoring an oscillator frequency.

According to the present invention, an impulse radio receiver for synchronization on a pulsed waveform sequence including at least one pulsed waveform. The receiver includes a radio frequency (RF) front end, a demodulator operatively connected to the RF front end and a processing unit operatively connected to said demodulator. The processing unit includes a switching mechanism which powers an RF component such as the RF front end and the demodulator, solely during time windows sufficient for testing an hypothesis regarding timing of the pulsed waveform. Preferably, the receiver includes multiple fingers which scan for and acquire the pulsed waveform sequence, and the outputs of said fingers are all connected to the switching mechanism. Preferably, the plurality of fingers is configured to test multiple hypotheses in parallel. Preferably, the fingers are operatively connected to an event generator which triggers fingers to scan for pulse waveforms of the pulsed waveform sequence. Preferably, the finger further includes a mechanism for performing a function such as self-activation, self-deactivation, activation of another finger, deactivation of another finger, turn on other functions of the receiver.

According to the present invention there is provided an impulse radio receiver for synchronization on multiple sequences of pulsed waveforms emanating respectively from multiple communications links. The receiver includes a radio frequency (RF) front end, a demodulator connected to the RF front end and a processing unit connected to the demodulator. The processing unit includes a switching mechanism which switches power to an RF component such as the RF front end and said demodulator, solely during time windows sufficient for testing in parallel multiple hypotheses regarding timing of the pulsed waveform sequences, and multiple fingers which scan for and acquire pulsed waveforms each of the pulsed waveform sequences, wherein the outputs of said fingers are all connected to said switching mechanism, and the fingers acquire aid demodulate the pulsed waveform sequences in parallel. Preferably, the fingers each include a mechanism which turns on a receiver functions respective to the communications links.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
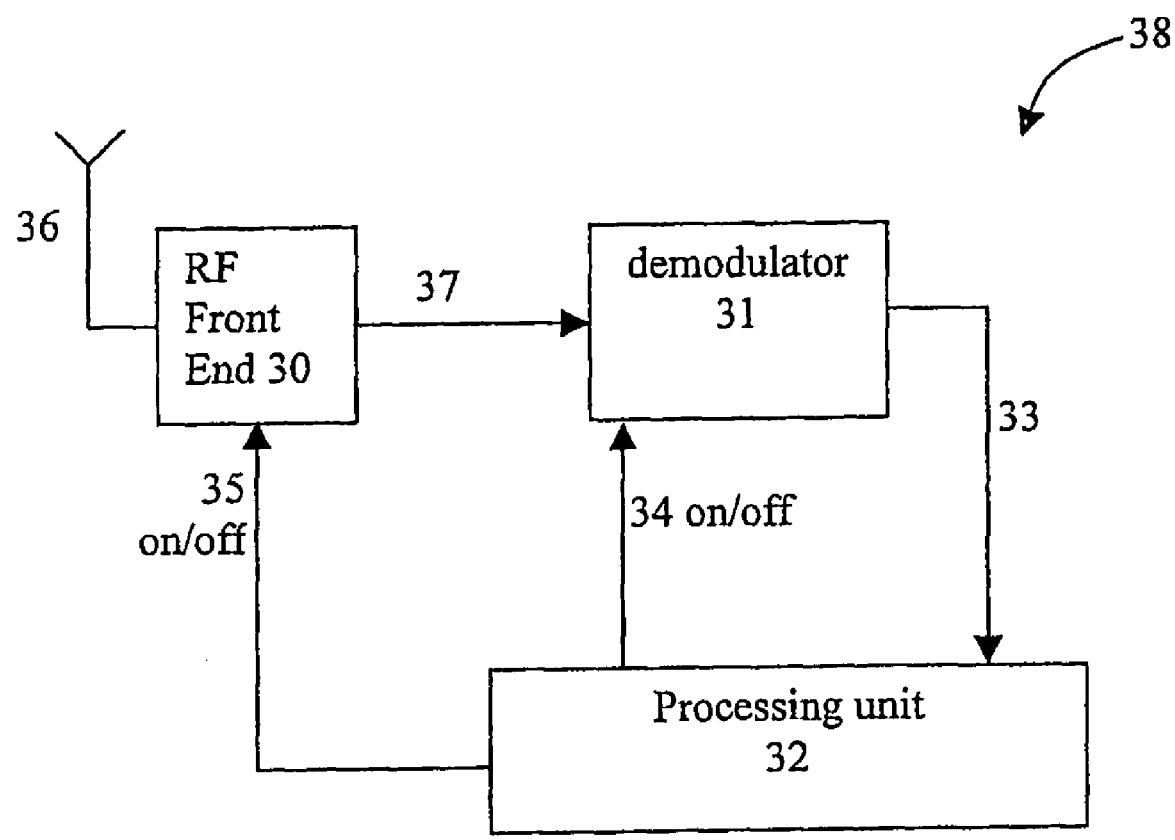
FIG. 1 is a block diagram illustrating a preferred embodiment of the system for low power fast impulse radio synchronization, in accordance with the present invention.

The present invention relates to fast impulse radio synchronization used for acquiring quickly an impulse radio synchronization sequence and achieving a low average power consumption. The present invention is primarily directed to applications of communication systems based on a non-continuous transmission wherein the interval between transmissions is predictable. Moreover, the present invention enables the reception of more than one packet concurrently.

The principles and operation of a system and method according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, the present invention is applicable to any communication system based on noncontinuous transmission, for example impulse radio schemes, when the interval between transmissions is predictable, the receiver has prior knowledge of the sequence of intervals between transmissions, and the transmissions are much shorter than the intervals. The present invention is further applicable when it is required to acquire the impulse radio synchronization sequence quickly and with low power consumption in order to have a low average power consumption when detecting a preamble.

Moreover, the present invention features the ability to receive more than one packet at the same time. This feature of the present invention is in contrast with regular synchronization methods which lock on one of the packets. It is very useful for many communication systems to have a device which is capable of acquiring more than one link in parallel.

Implementation of the method for low power fast impulse radio synchronization of the present invention involves performing or completing selected tasks or steps. Moreover, steps of the present invention could be performed by hardware, by software on any operating system of any firmware, or a combination thereof. In particular, selected steps of the invention could be performed by a computerized network, a computer, a computer chip, an electronic circuit, hard-wired circuitry, or a combination thereof involving a plurality of digital and/or analog, electrical and/or electronic, components, operations, and protocols. Additionally, or alternatively, as software, selected steps of the invention could be performed by a data processor, such as a computing platform, executing a plurality of computer program types of software instructions or protocols using any suitable computer operating system. Here we concentrate on low power synchronization for data communication based on pulses, the duration of which is short relative to the interval between consecutive pulses (as is the case, for example, with UWB communication). In many cases the radio is battery operated, thus the radio needs to acquire the transmission efficiently, both in time and with respect to power used for such an acquisition process. This is applicable, for instance, to RFID devices (tags) which have to acquire a pulsed transmission from a reader, and be extremely power efficient. It is thus desirable to turn off the receiver between search windows, each window suitable to receive a pulse, while receiving a long synchronization pulse sequence wherein the sequence is predictable and known to the receiver.

An impulse radio transmitter transmits a packet including a preamble. The preamble includes N pulses, each pulse starts T seconds apart from the previous pulse start. The length of the preamble is not required to be constant. For example, a sequence of pulses having cycle of 3, with delays t1, t2, t3, t1, t2, t3, etc. It is advantageous, in practice, to use a pulse train instead of a single pulse in older to reduce the peak power transmitted. The symbol duration is preferably not larger than W, the search window.

Referring to the figures, FIG. 1 is a simplified block diagram illustrating the implementation of a preferred embodiment of the present inventions Antenna 36 receives RF signal and passes the signal RF front end (RFFE) 30 which amplifies, filters and down converts the signal. RF front end 30 outputs an analog signal 37 to demodulator 31. Demodulator 31 processes analog signal 37 and provides a digital output 33. In the case when received pulses are not modulated, demodulator 31 may include a pulse detection circuit. Digital output 33 is received by processing unit 32. Processing unit 32 generates or/off signals to both RF front end 30 and demodulator 31 switching off RF front end 30 and/or demodulator 31 for a duration of time comparable to the timing of the pulsed waveform in the received RF signal.

Processing unit 32 contains a combination of software, hardware or firmware that implements packet synchronization and data extractions Processing unit 32 may perform other functions such as: parameter estimation, and controlling a transmitter and additional functions of receiver 38 for example: data demodulation, symbol synchronization, deframing, passing the payload to a host, and error correcting code decoding. Receiver 38 runs further processing required for detecting and using the detected packet.

Processing unit 32 includes parallel processes; each process is denoted herein as a 'finger', discussed below in reference to FIG. 2.

Figure 2:
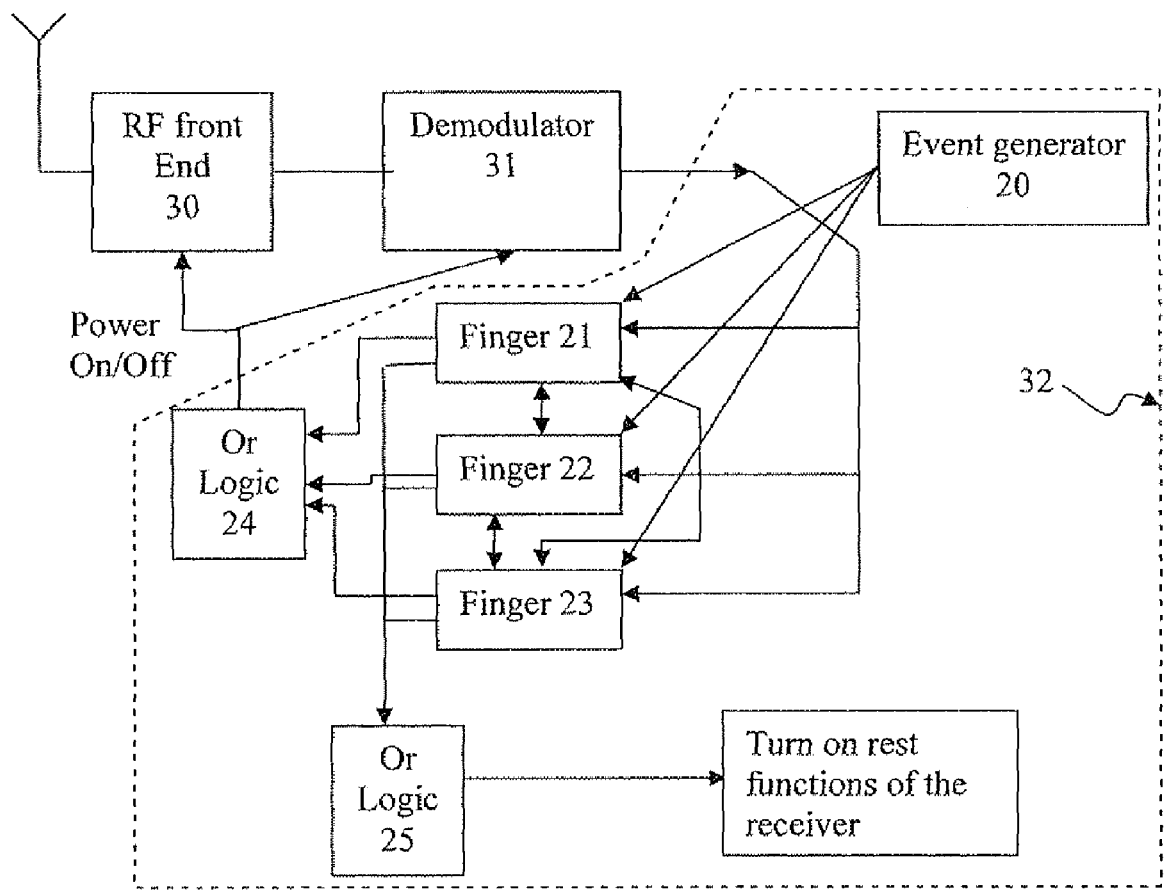
FIG. 2 is a block diagram illustrating an exemplary preferred embodiment of the method and corresponding system for low power fast impulse radio synchronization, in accordance with the present invention.

Referring to FIG. 2 illustrates an exemplary implementation of the receiver in accordance with the present inventions. An event generator 20 creating triggers. Event generator 20 may be a random event generator which creates triggers at random times. On the average, every $T_1$ seconds, random event generator 20 creates a trigger, or alternatively, an event generator 20 creates evenly spaced triggers, spaced by $T_1$. The trigger turns on an available finger 21, 22, or 23 which is not currently activated. In a preferred embodiment of the present invention, all the fingers are equivalent, performing identical functions $T_1$ is chosen as a trade off between power consumption and synchronization time. Moreover, it is to be understood that $T_1$ can be chosen as needed and is usually different than T. For the scanning event generator embodiment, it is important to choose $T_1$ different than T and not having common multiplication less than $T*T_1$.

A clock function (not shown) synchronizes all the entities to a common time base. The accuracy of the time base should be significantly better than the ratio of W/T.

Fingers 21-23 are processes which test a hypothesis that a synchronization sequence is being received at a specific instant. Fingers 21-23 perform the following steps:

(a) Turn on and off RF front end 30 and/or demodulator 31.

(b) Test whether part of digital output 33 may be part of a preamble.

(c) Predict the time positions of one or more of the pulses of the sequence of the preamble. In the case that (step b) test provides identification of a preamble, according to a predetermined criterion, the finger searches for a Start Frame Delimiter.

(d) Any active finger 21-23 may activate other functions of receiver 38 when a Start Frame Delimiter is detected.

(e) Optionally, a finger can activate and/or deactivate additional finger or fingers, (f) Optionally, a finger can activate mid/or deactivate itself.

(g) Optionally, a finger can deactivate itself and be activated by event generator 20.

In an exemplary embodiment, each finger 21-23 contains the full set of functions as a full packet receiver, and as a result, a finger detects the preamble, and then detects the Start Frame Delimiter and then the rest of the packet. In this way few packets from few users can be decoded in parallel. This mode of operation is desired to increase the capacity of the system and or for allowing uncoordinated users to transmit almost without having a chance of collision. For example if T/W=100, the collision probability is ideally 1% of the original collision probability, where original collision occur when two packets overlap, and new collision event occur only if the pulses of both packets occur at the same time window W.

Each finger can independently of other fingers, turn on the RF front end and the demodulator, or if applicable, the pulse detection apparatus. It is to be understood that in order to save the maximum possible power, when the RF front end or the demodulator is turned off, because no finger has turned it on, all non essential functions are shut off and are not draining current from power. Essential functions are those which are needed to maintain synchronization or functions in which the time required for turn-on and or turnoff is too long to be justified.

During the time receiver 38 is on, receiver 38 can detect the presence of a pulse. Given that the pulse was present in the received signal, the detection probability is $P_d$. The probability the detection is missed is $1-P_d$. In case there is no pulse present in the received signal, there is a probability $P_f$ for false alarm i.e. false detection of a pulse. Thus, more than one hypothesis must be tested.

Each active finger after the first activation by event generator 20, operates in a verification phase, i.e. a pulse is already detected, now finger 21-23 verifies the detection is not a false alarm. Finger 21-23 checks for the occurrence of the next pulse T seconds from the time the first pulse was detected. In case the pulse not detected, the active finger 21-23 is waiting another T seconds in order to try detecting the next pulse. An example of operation in the verification mode is checking K consecutive pulses for a pulse. If such verification fails finger 21-23 deactivates itself. In an exemplary embodiment of the present invention, the threshold may be changed or the pulse detection algorithms may be changed in the verification mode relative to the first pulse detection mode.

According to an embodiment of the present invention, receiver 38 features an oscillator (not shown) or a timing input mechanism supplying timing from all external device. The oscillator provides the timing of the time windows turned on by the fingers. Random event generator 20 generates random times, therefore, the oscillator may be slower featuring less time resolution and accuracy than in the verification mode. In case the event generator is of a scanning type, its accuracy is also not critical. Once a finger 21-23 finds a pulse, the finger needs an oscillator and a counter to provide the time of the next window.

In case the event generator creates a trigger while one or more of the fingers 21-23 are active, a non-active finger, if available, is activated featuring a similar operation to the previous active fingers. There can be theoretically many fingers 21-23 operating at the same time, but practically the number of available fingers is limited to a predefined number P, according to the complexity of the implementation.

After a finger detects a predetermined number of pulses out of a predefined number of trials, the finger declares a success and the system is locked on the preamble, waiting for the Start Frame Delimiter. Alternatively, further verifications are needed before declaring success Still alternatively, the first and rest of the verifications may be different than the one mentioned.

Since each one of the fingers can turn on independently RF front end 30, an OR logic 24 combines the inputs to RF front end 30. Moreover, since each one of fingers 21-23 can independently activate the rest of the receiver functions, an OR logic 25 unites the requests for activating the rest of the receiver functions.

According to an embodiment not shown in FIG. 2, whenever receiver 38 enters the mode of packet reception, receiver 38 turns off all the fingers and turns on and off the Rb and the demodulator as desired, until the end of the packets. In an exemplary embodiment of the present invention, each packet contains a length field in order to know the end of the packet.

In an exemplary embodiment of the present invention, there is a sequence of pulses having cycle of 3, with delays t1, t2, t3, t1, t2, t3 . . . between the pulses. Event generator 20 is generating random or scanning events to activate an available finger 21-23. An active finger is checking for the presence of a pulse. In the case where a pulse is not found, the finger deactivates itself. In the case where a pulse is found or suspected to be found since it is not a certain pulse, two additional fingers are activated. The original finger is checking the hypothesis t1, t2, t3, . . . . The original finger then opens its next window t1 from the beginning of the current window, optionally doing pulse centering as described above, and then another one t2 sec from that one, and so on. The second finger is checking the hypothesis t2, t3, t1, . . . , and the third finger is checking the hypothesis t3, t1, t2, . . . i.e. the second finger opens its next window t2 from the beginning of the current window, optionally doing pulse centering as described above, and then another one t3 sec from that one, and so on.

For each one of the active fingers, after a finger detects a predetermined number of pulses out of a predefined number of tries, the finger switches to verification phase checking another predetermined number of pulses out of a another predefined number of tries, and after making any further required verifications declares a success and the system is locked on the preamble, waiting for the Start Frame Delimiter. On the other hand, after a predetermined number of tries in which no pulse is detected, the finger deactivates itself. It is to be understood that the system is designed to be operated in the region of high false alarm rate, requiring several phases of verification. In such systems the first verification is usually still with significant false alarm rate, therefore additional verifications are needed. For example, if the first pulse detection and each verification afterwards have a false alarm rate of 0.1, two verifications are needed to reduce the false alarm rate to 0.001.

In an alternative embodiment leading to slower acquisition than described above, fewer than three hypotheses are tested by activating none or fewer then 2 additional fingers. The tested hypotheses may be: not changing, changing in a pattern or changing randomly from one activation to another. For example a single finger can test all the times the hypothesis t1, t2, t3, or that single finger in a different embodiment can test a hypothesis drawn randomly from t1, t2, t3, . . . t2, t3, t1 . . . and t3, t1, t21 . . . .

In an alternative embodiment of the present invention wherein a detection of a single pulse is not reliable, a finger is activated by the event generator and each finger is checking a sequence of J pulses for certain property or certain code. This is in contrast to the above-described embodiment wherein each pulse detection checks the presence of each individual pulse.

For example consider that each pulse is a pulsed sine wave, and there are two frequencies possible for this sine wave. This means that each pulse is containing a Frequency Shift Keying (FSK) symbol. The demodulator is FSK demodulator instead of pulse detector. The preamble is composed of this FSK pulse sent each T seconds. The symbols in the preamble are FSK modulated by a binary sequence known to the receiver mid is periodic with period L. Event generator activates an available finger. The finger opens its window J times aid demodulates the FSK. The J bits are tested against all sections of length J in the sequence L. For example, if the transmitted sequence is 1100101, and J=5, the finger test the 5 received bits against the patterns 11001, 10010, 00101, 01011, 10111, 01110, 11100. If there is a sufficient match, i.e. more than a predefined number of bits are the same, this finger stays active for collecting more symbols and raising the certainty level. For example, collecting additional 41 pulses and testing the sequence of J+J1 bits against all sections of length J+J1 in the sequence L. For example if the sequence 00101 was detected, collecting another 5 bits the received sequence is compared to 0010111001. It is possible to choose a one matching threshold or sequence of thresholds to declare lock on the preamble and a different one for which fail deactivated the finger and in between these two thresholds, the finger will collect more data. Instead of sequence of bits modulated by FSK there can be sequence of groups of $\log_2(M)$ bits modulating MFSK symbols.

Instead of a hard decision as in the example above, a soft decision is also an option. Instead of FSK or MFSK there can be pulses modulated by PPM or MPPM, or OOK. Another possible embodiment, either for modulated pulses and unmodulated pulses, energy from different windows is accumulated i.e. integrated, coherently or non-coherently. The accumulated metric is then compared with a threshold. For example, the preamble is composed of evenly T spaced pulses, accumulation of energy of 5 pulses is desirable for reliable detection, and the result is compared to a threshold. Each time a finger is activated by the event generator, it is activated for 5 times, each window separated by T seconds. If the 5 pulses energy passed the threshold, the finger continues to the verification phase in which another 5 pulses are accumulated and the result is compared to a threshold. If the verification was successful there may be additional verifications, as required.

In case the length of time between windows (T) or the length of the windows (W) are adjusted in a way such that the pulse is expected in the middle of the window, the accuracy of the oscillator should be greater than or equal to W/2T. If such adjustments are not made, or made with less accuracy, either more accurate oscillator is needed to avoid the pulse running out of the window, or, alternatively, additional finger or fingers are activated with windows adjacent to the original one to "catch" the pulse. In order to implement the window by logic, the oscillator frequency should be equal to or higher than 1/W. Alternatively, a slow oscillator is used together with a analog timer to time the window, such as one-shot analog circuit or any other circuit used to time the window. In case the oscillator frequency is higher than 1/W and the position of the pulse is obtained at least approximately from the demodulator, then, the time to the next window (T) can be set such that the next pulse will be expected to occur in the middle of the window. This is done by waiting a time equal to (T minus W minus the shift of the pulse from the middle of the window) from the end of the current window.

Turning RF front end 30 off reduces the power consumption of the circuit. Turning RF front end 30 on quickly without damage to the circuit or the operation of the circuit is essential to low power reliable circuit operation. As is well known in the art, RF front end 30 can be made such that turning it on and off will not damage the operation of the circuit. RF front end usually includes the following components: amplifiers, filters, mixers and local oscillators (hereinafter noted as LO).

In a preferred embodiment of the present invention, all sub-circuits and active elements in the RF front end, apart from the LO, are wide bandwidth devices. The bandwidth of the circuit is at least as large as the pulse bandwidth, including the bandwidth of filters. As such, their response time to changes is of the order of pulse width or lower. Therefore, without loss of generality any such circuit can be made fast enough to turn on and off in a time smaller or equal to the smaller between pulse width (W) and (1/pulse bandwidth). In an exemplary embodiment, a RF amplifier can be gated on and off by changing the DC bias applied to its gate. However the bias filter should be with fast response, and this makes the bias circuit mole noise sensitive.

In a preferred embodiment of the present invention, in order to shorten the initializing period of turning on the RF front end 30, and as a result reducing the required power and enhancing circuit response, the state variables of the circuit, before the circuit was turn off, are stored. Due to the state variables storing, the information describing the state of the circuit is retained when the circuit is turned off. The retained information is used upon turn on to restore the circuit to the same state it was before turn off.

In a preferred embodiment the Local Oscillator (LO) part of RF front end 30 is made of a synthesizer locked on a crystal reference by a phase locked loop (PLL). In a preferred embodiment, the synthesizer includes the following components arranged in a loop: VCO, loop filter, frequency divider and phase comparator. In a preferred embodiment, the crystal reference part of the RF front end 30 LO is also the timing oscillator of circuit 38.

The state variables of the loop filter should be stored during the off state of the synthesizer. For example, if the loop filter contains capacitors, the circuit should contain switches in order to prevent the voltage drop during the off state.

The PLL may feature possible loss of accuracy since the oscillator is usually not turned on the same phase every time and by that introducing a phase noise. This phase noise makes the PLL much like an Automatic frequency correction (AFC) circuit, as described below, which only keeps the frequency the same as the reference but not the phase. In case the turn on time of the oscillator is unknown, there may be also frequency shift. The frequency can be made more accurate when the oscillator is turned on for the full window period but feeding the loop counter only at the second half of the window period for examples.

The loop can be arranged to work in AFC mode, during the window duration the oscillator is on and is connected to a counter. At the end of the window the counter is compared to a number representing what the number of cycles during the window should be. If the result of the counter is larger then it should, a small positive pulse is outputted. If the result of the counter is smaller, a small negative pulse is outputted. The pulses are then fed to a properly designed loop filter. Whenever the turn on time of the oscillator is unknown, there is a frequency shift. As described above, the frequency can be made more accurate when the oscillator is turned on for the full window period but feeding the loop counter only at the second half of the window period for example.

Whenever the VCO is turned on, there is a circuit which responsible to feed it with a voltage (or current) such that its frequency will be correct. Such voltage may be stored on a capacitor or any other analog storage and applied to the VCO input when needed, or alternatively, the implementation of the circuit is at least partially digital and such voltage is stored digitally and outputted to the VCO by D/A or any means of controlling analog voltage (or current) digitally. In an exemplary embodiment of the present invention, the VCO input is connected to a sample & hold circuit. The sample & hold is stoning the output of the loop filter during the time the synthesizer is turned off. The frequency divider divides the VCO frequency by N. The synthesizer is counting the cycles of the VCO and providing a pulse or transition every N cycles. Here, since the cycles appear only during the window, for each interval of H cycles of which the VCO is off, the number H should be computed and added to the counter. H can be calculated because it is predictable. However, to make its calculation accurate the time base turning on and off the RF front end should better be derived from the same reference oscillator.

In a preferred embodiment, the loop filter of the synthesizer is wide enough to make its turn on fast and therefore enabling the synthesizer to be turned off for power saving purposes.

In an alternative embodiment wherein the loop filter of the synthesizer is not wide enough to make its turn on fast, the LO should not be turned off. This alternative embodiment saves less power than the preferred embodiment, however, the LO may not be the major power consumer, in RF front end 30.

Thus, it is understood from the embodiments of the invention herein described and illustrated, above, that the method and corresponding system for low power fast impulse radio synchronization, of the present invention, are neither anticipated or obviously derived from the prior art teachings.

Moreover, implementation of the present invention results in significantly decreasing the power consumption of the receiver.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

It is to be understood that the present invention is not limited in its application to the details of the order or sequence of steps of operation or implementation of the method for low power fast impulse radio synchronization or to the details of construction, arrangement, and, composition of the corresponding system thereof, set in the description, drawings, or examples of the present invention.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and broad scope of the appended claims and their equivalents.

While the invention has been described with respect to a limited number of embodiments, it will be appreciated that many variations, modifications and other applications of the invention may be made.

What is claimed is:

1. A method for synchronizing on a pulsed waveform sequence including at least one pulsed waveform, the method comprising the steps of:

(a) providing an impulse radio receiver including a radio frequency (RF) front end, said RF front end operatively connected to a demodulator, said demodulator operatively connected to a processing unit; and (b) powering at least a portion of at least one RF component selected from a group consisting of said RF front end and said demodulator, solely during at least one time window sufficient for testing at least one hypothesis regarding timing of the at least one pulsed waveform; wherein said powering is controlled by said processing unit; and (c) scanning for and thereby acquiring the pulsed waveform sequence by said processing unit, wherein said acquiring is achieved with a non-negligible probability of a false alarm;

wherein said plurality of hypotheses are tested in parallel, whereby performance of said processing unit is maintained despite the non-negligible probability of a false alarm.

2. The method according to claim 1, further comprising the step of:

(d) testing said at least one hypothesis wherein said testing includes accumulating at least one signal of the at least one pulsed waveform.

3. The method, according to claim 1, further comprising the step of (d) testing said at least one hypothesis wherein said testing includes correlating with the at least one pulsed waveform.

4. The method according to claim 1, further comprising the step of:

(d) testing said at least one hypothesis wherein said testing includes:
  (i) correlating with the at least one pulsed waveform, thereby obtaining a correlation result;
  (ii) accumulating said correlation result of the at least one pulsed waveform.

5. The method according to claim 1, further comprising the step of:

(d) powering at least one other function of said receiver subsequent to said testing.

6. The method, according to claim 1, wherein said impulse radio receiver is an ultra-wide band receiver.

7. The method, according to claim 1, wherein the at least one pulsed waveform includes a series of pulses modulated by a binary sequence.

8. The method, according to claim 1, wherein said at least one hypothesis includes a plurality of hypotheses, and wherein said powering allows testing a plurality of hypotheses in parallel regarding timing of the pulsed waveform sequence.

9. The method according to claim 1, wherein the pulsed waveform sequence includes a plurality of pulsed waveforms, wherein a time interval between consecutive said pulsed waveforms is uniform.

10. The method according to claim 1, wherein said scanning is performed every T1 seconds, wherein T1 is not an integral multiple of a time interval between consecutive said pulsed waveforms.

11. The method according to claim 1, further comprising the step of (d) storing state variables pertaining to the receiver;
(e) said powering down at least a portion of at least one component of the receiver;
(f) powering up and restoring said at least one component of the receiver;

whereby upon reading said state variables, said powering up and restoring is expedited.

12. The method, according to claim 11, wherein said restoring includes restoring an oscillator frequency.

* * * * *